Dec. 19, 1944.    W. W. CARTER    2,365,331
HOLLOW MOLDED PREFORM OF FIBER AND FUSIBLE PLASTIC MATERIAL

Filed March 27, 1942

Inventor
William W. Carter
by Wright, Brown, Quinby & Nay
Attys.

Patented Dec. 19, 1944

2,365,331

UNITED STATES PATENT OFFICE 2,365,331

HOLLOW MOLDED PREFORM OF FIBER AND FUSIBLE PLASTIC MATERIAL

William W. Carter, Needham, Mass., assignor to Brayton Morton, Boston, Mass., as trustee Application March 27, 1942, Serial No. 436,416

3 Claims. (Cl. 229—2.5)

The object of the present invention is to produce hollow molded preforms from fibers and resins or other plastic substances, as manufactures capable of being converted by heat and pressure into plates and other dishes, trays, cups and other articles having a raised rim or of hollow formation, which are impervious to water, are substantially unbreakable, and may be resistant to high temperatures as well.

Hollow articles of various kinds have heretofore been molded from synthetic resins, particularly the phenolic resins, which are unaffected by water, and by heat below the temperature of destructive distillation; but such articles are brittle. Also panels and sheets of various thicknesses have been made of layers of paper impregnated with such resins, united by heat and pressure. Sheets of this character, and articles cut from them are tough and resistant to fracture by virtue of their content of fiber, and they are more or less resistant to water and heat due to their content of resin; but they can be made only in the flat or with cylindrical curvature. They cannot be molded with a hollow formation bounded on all sides by a raised portion, without cutting out pieces. Molding requires flow of the material under pressure of the molds, and when the material contains fibers, the flow caused by molding displaces or breaks and more or less separates the fibers in those parts of the material where flow occurs, with the result that the finished article is weak and brittle in those parts where any appreciable flow has occurred. In the case of structures made of paper sheets impregnated with resin, distortion either breaks the sheets if of a character to stretch them and if carried beyond a very small amount, or causes the sheets to pucker and make folds blocking the movement of pressing dies. While this objection is not so pronounced in the case of products made of layers of cloth impregnated with resin, the difference in the latter case is one of degree only, and the depth to which material of impregnated laminated cloth construction can be molded is limited. The high cost of this material is an objection to its commercial use and prohibits its use for many purposes.

The present invention has overcome the objections above noted and made possible the production of molded hollow articles, unlimited as to depth, of low cost, which are of homogeneous structure and uniform strength throughout, are impervious to water when the incorporated plastic is insoluble in water and, when containing heat hardening resin, are unaffected also by heat below the temperature of carbonization. These accomplishments are obtained by providing a mixture of fibers, a dispersion of resin or other plastic suitable for the purpose, and water in the consistency of paper pulp, or a more or less similar consistency, forming the pulp into an approximation of the desired finished article while the pulp is fluid and the fibers are free to assume any arrangement constrained by the forming agencies, removing the water content of the formed or molded mixture, and finally compressing and giving the finished dimensions and contours to the article, and curing the content of resin in the material, by application of pressure and heat.

The invention consists in preforms of hollow articles having generated contours and composed of intermingled fibers (such as those used for paper making), and dispersed particles of resin or other suitable plastic substance, capable of being compressed and converted by pressure with heat sufficient to fuse the resin (and also to cure when a heat hardening resin is used), into a compact, tough and water repellent article suitable for general uses.

Articles such as here contemplated are characterized by sides and bottom or top walls or flanges of substantially uniform structure and composition throughout. For want of a better term, I have defined them as of angular generated form, meaning that their bounding surfaces are such as would be generated by a line which is other than straight revolving about an axis, or traveling along a line otherwise than straight, which extends transversely to the generating line. Applying this definition to the article herein illustrated, the generating line would be that consisting of the segments to which the reference characters b, d and e are applied in Fig. 2, together with half the bottom of the preform there shown, revolving around the geometrical axis of the preform. But the invention is not limited to articles bounded by surfaces of revolution only, but includes those of polygonal and other forms, regular or irregular, and complete or incomplete polygons. The generating line may be a continuously curved line of uniform or varying radii of curvature, or it may be made of two or more straight or curved portions joined on more or less sharp angles or curves. The sections of such an article on planes transverse to the travel of the generating line exhibit portions angularly disposed to one another.

In the drawing—

Figure 1:
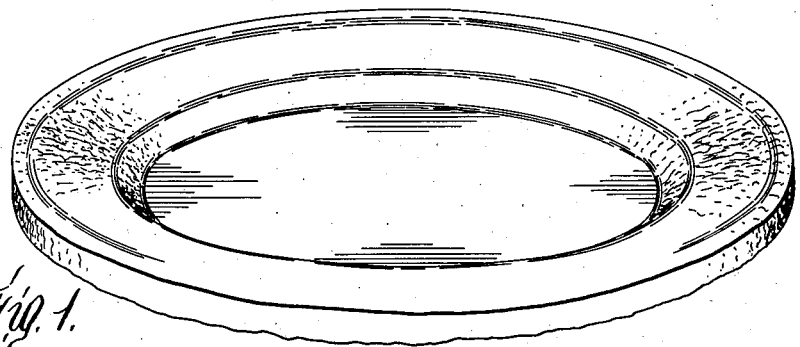
Fig. 1 is a perspective view of a preform made in accordance with this invention adapted to be converted by heat and pressure into a dessert plate, this being one of the many forms in which the invention may be embodied.
Figure 2:
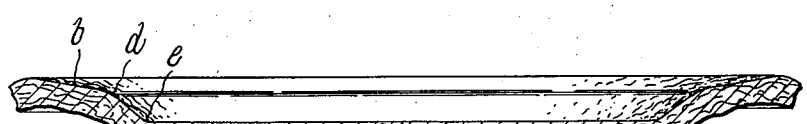
Fig. 2 is a diametral cross section of the preform shown in Fig. 1.
Figure 3:
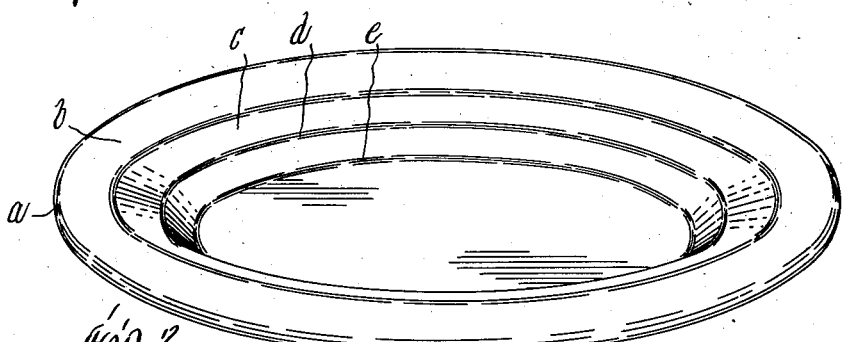
Figure 4:
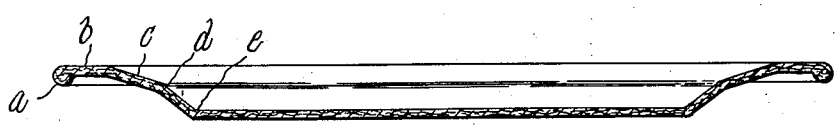

Figs. 3 and 4 are views similar to Figs. 1 and 2, respectively, of the result accomplished by application of heat and pressure to the article shown in Figs. 1 and 2.

In carrying out this invention, a pulp is made of fibers and water. Any fibers suitable for paper making may be used for this purpose, including fibers of such short length as are obtained from ground wood. I may use new pulp, such as sulphite wood pulp or a mixture of sulphite and ground wood fibers, or waste paper. Indeed old newspapers well beaten with water make a satisfactory and very inexpensive pulp.

With the pulp of fibers is mixed a suitable content of resin. Any resin may be used without departing from the principle and scope of the invention, but I prefer to use a synthetic resin of the heat hardening type, such as a formaldehyde-phenolic resin, rather than a resin of the thermo-plastic type. However, for articles which are not liable to be subjected to temperatures high enough to soften them, resins of a thermoplastic nature may be used.

The resin is mixed with the pulp in the pulp beater, and in order to obtain and maintain uniform dispersion of the resin through the pulp, I prefer to follow the procedure of my Patent No. 2,027,090, dated January 7, 1936, entitled Means and method for dispersing matter in manufactured material. According to that procedure, resin in finely divided condition is first mixed intimately, together with a sparse dispersion of fibers, throughout a body of gel forming liquid, which holds the dispersed fibers and particles of resin in suspension and, after gelling and being broken up in the pulp beater, encases particles of the resin and binds such particles to single fibers and groups of fibers of the original dispersion so that, when mixed with the pulp of the main fiber furnish, the resin particles are prevented by the attached fibers from settling out of the dispersion or being carried away with the extracted water when the pulp is being deposited on a form or shaped in a mold. In brief, the method of said patent causes the resin to be introduced into the pulp in small particles, enables the particles to be uniformly mixed and dispersed among the fibers, and causes the dispersion to remain substantially the same during the process of forming the pulp into the approximate shape of the article to be made. Attention is directed to said patent for a full description of the process, which is by reference made a part of this specification. That mode of dispersing resin is not a limitation of the present invention, however, and molded preforms containing resin incorporated in any other suitable way are within the protection herein claimed.

The proportional content of resin may vary widely. I have produced highly satisfactory plates and other articles in which the resin amounts by weight to about 40% of the weight of dry fiber in the pulp. But it may range from a percentage somewhat below 20% to one somewhat above 60%, depending on the qualities of toughness, hardness, strength and resistance to wetting and to chemical attack required of the finished article.

The pulp dispersion so produced is then formed into an approximation of the required article, but with greater thickness, by deposition under suction on or in a form, or by pressing between molding dies, by forcing the pulp into an enclosed space of proper form, having suitable provisions for drainage, or otherwise. That is, the same procedure may be used for this purpose as has been used heretofore for making articles of wood pulp, or any other suitable and satisfactory procedure may be followed. The shapes and articles capable of being thus produced include all which may be molded or applied externally upon or internally within a form, or forced into a suitably drained enclosed chamber, and from which the shaped mass of pulp can be removed when enough of the contained water has been extracted and the fibers have become felted together strongly enough to permit handling. For producing articles of such dimensions and proportions as require reinforcement by stronger material, or of which the use requires attachment to supports, the pulp may be molded around inserts suitable for the purpose. Thereafter the residual water among the fibers is evaporated.

The foregoing describes the subject matter of the present invention. This subject matter embodied in any one of multifarious forms is an article of manufacture capable of being sold and shipped by the maker to processors for further treatment involving pressure and heat application. In such further treatment the preform is placed between molding dies having smooth surfaces and contours complemental to the required contours of the finished article, and is subjected to pressure and heat of degrees sufficient to compact the fibers into a dense structure, and cure the resin. The loose textured preformed article may be thus compressed to about one-third, more or less, of its original thickness. As there are limits of thickness beyond which it is not feasible to go in forming the article from pulp, particularly in the case of those deposited by suction, on account of the difficulty of extracting water from excessively thick formations, it may be desirable in many cases to place two or more of the pulp formations together in the final mold to obtain a finished article of a prescribed thickness and density. Under the effect of heat and pressure, the resin is melted and caused to flow so that it fills the reduced interstices between the fibers and forms a film at the surfaces of the article. When two or more of the preformed articles are thus pressed together, the resin thus coming to their contiguous surfaces binds them together into what is in effect a single integral structure.

In some cases it is found desirable to apply a coating of powdered or liquid resin on the surfaces of the preformed article before final molding; this in order to submerge any fibers which may stand out from the surfaces and to form a smoother surface than would be obtained otherwise. Coloring matter may be applied at the same time to these surfaces, whereby the ornamental effect is enhanced.

The preformed shape given to the pulp article is so nearly the same as that of the finishing dies, that no appreciable flow or shift of the fibers occurs in the latter and virtually the only change is reduction in thickness of the article. That is, the structure and lay of the fibers remain substantially unchanged, except for compacting from their original molded shape. But minor formations, such as the bead shown at $a$ in Fig. 4, and distinct zones such as those shown at $b$ and $c$, which did not exist in the pulp preformation, may be made, and the angles, as at d and e, between different surfaces may be sharpened, without causing any disruptive flow or displacement of the fibers.

The final result is an article in which the fibers are substantially unchanged in relationship to one another as a result of final pressing, except in that they are more closely packed together, and in which the fibers are unbroken and as strong intrinsically as in the original furnish. The article is unbreakable by the shocks and accidents which are so great a cause of destruction of glass and chinaware. It may be dropped on a hard floor or knocked against the edges of a sink in being washed, without breaking or chipping. It may without injury be washed in ordinary hot water and sterilized in boiling water. When a heat hardening resin is used, it may be safely subjected to higher temperatures than that of boiling water up to the degree at which destructive distillation of the resin and fibers begins.

The drawing illustrates the invention embodied in a dessert plate for table service. But it will be understood that plates and dishes of all other dimensions and shapes, cups and saucers, vegetable dishes, platters, trays, and a great variety of other articles, all of which are included within the term "article of dish shape," may be made in the same way.

What I claim and desire to secure by Letters Patent is:

1. An individual molded pulp article of generally dish shape and of substantially uniform composition throughout, consisting of a loosely felted and porous compressible mass of fibers die-molded in such dish shape from an aqueous suspension of fibers and discrete particles of uncured plastic material curable by heat, in which the resin particles are substantially uniformly distributed among the fibers and retained thereby.

2. An individual resin-bearing molded pulp article of hollow angular generated form and of substantially uniform composition throughout, consisting of a loosely felted compressible mass of fibers die-molded in such form from an aqueous suspension of fibers and disintegrated uncured synthetic resin, in which the resin particles are substantially uniformly distributed among the fibers and entrapped thereby.

3. An individual molded pulp article of hollow angular generated form consisting of a loosely felted porous substantially dry compressible mass of fibers and fusible plastic material interspersed among such fibers in substantially uniform distribution among them, said mass being die-molded in said hollow form from an aqueous suspension of such fibers and fusible plastic material, the fibers being substantially free from tensile stress.

WILLIAM W. CARTER.